(12) United States Patent  
Baron

(10) Patent No.: US 7,079,707 B2
(45) Date of Patent: Jul. 18, 2006

(54) SYSTEM AND METHOD FOR HORIZON CORRECTION WITHIN IMAGES

(75) Inventor: John M. Baron, Longmont, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 626 days.

(21) Appl. No.: 09/909,534

(22) Filed: Jul. 20, 2001

(65) Prior Publication Data

US 2003/0016883 A1 Jan. 23, 2003

(51) Int. Cl.
G06K 9/36 (2006.01)

(52) U.S. Cl. .................... 382/289; 348/208.3

(58) Field of Classification Search ........... 382/289, 382/296, 297, 293; 358/3–22; 345/649, 345/650; 348/208.99, 208.3, 208.5, 14.01, 348/14.03, 649, 650; 396/56–57
See application file for complete search history.

(56) References Cited

U.S. PATENT DOCUMENTS

| | | | | |
|---|---|---|---|---|
| 4,245,353 A | * | 1/1981 | Bynum | 455/239.1 |
| 5,185,667 A | * | 2/1993 | Zimmermann | 348/207.99 |
| 5,506,918 A | * | 4/1996 | Ishitani | 382/289 |
| 5,900,909 A | * | 5/1999 | Parulski et al. | 348/231.6 |
| 5,901,253 A | * | 5/1999 | Tretter | 382/289 |
| 5,940,544 A | * | 8/1999 | Nako | 382/293 |
| 6,359,650 B1 | * | 3/2002 | Murakami | 348/333.04 |
| 6,411,743 B1 | * | 6/2002 | Koh et al. | 382/290 |
| 6,563,535 B1 | * | 5/2003 | Anderson | 348/231.2 |
| 6,567,126 B1 | * | 5/2003 | Slatter et al. | 348/345 |
| 6,603,502 B1 | * | 8/2003 | Martin et al. | 348/36 |
| 6,710,797 B1 | * | 3/2004 | McNelley et al. | 348/14.16 |
| 6,898,742 B1 | * | 5/2005 | Koyanagi et al. | 714/700 |

OTHER PUBLICATIONS

Sharp GP1S36 Tilt Detecting Photointerrupter (pp. 1-3), The Sharp Electronics Corp. (1998).

* cited by examiner

Primary Examiner—Yon J. Couso

(57) ABSTRACT

The present invention includes a system and method for the correction of user induced inadvertent orientation errors in captured digital images before the digital image is saved to a storage media or memory. A system of the present invention checks a user-selectable input to determine if the orientation correction has been enabled, enables a tilt determining mechanism which senses orientation errors when the feature is enabled, corrects the orientation errors in the viewed image, displays a corrected digital image to the user and allows the user to store a digital representation of the corrected image into a memory. The method of the present invention includes receiving a digital representation of an image, identifying vertical or horizontal lines contained within the image, determining an orientation error, rotating the digital representation of the image to reduce the orientation error and displaying a corrected digital image.

19 Claims, 3 Drawing Sheets

SYSTEM AND METHOD FOR HORIZON CORRECTION WITHIN IMAGES

TECHNICAL FIELD

The present invention relates to image processing to eliminate errors introduced during the image capture phase and more particularly, to a system and method for correcting errors introduced by individuals who captured the image with respect to horizontal, vertical or similarly well defined orientations.

BACKGROUND

Cameras, and other image capturing devices, have been used by individuals to record visual images for many years. Earlier cameras used film in which an image was captured on a negative and, once captured, used to create visual images which portrayed the original photographed scene. More recently, digital cameras have become available and their popularity has increased over the last couple of years. Digital cameras typically record captured images as bitmap images in a storage device such as a 3½ inch disk or similar storage media. These stored images may be processed or modified by a computer user and may be printed out and used accordingly. While original digital cameras include basic functionality, today's digital cameras include numerous features and in some instances include features which cannot be included with film-based cameras. For instance, storage techniques have evolved in such a way that digital cameras may store hundreds of low resolution images. Additionally, digital camera users may select the resolution desired for images being captured. The digital camera user may select images to be recorded in low, medium, or high resolution modes. As the resolution of the captured image increases, the amount of memory dedicated to storing the image also increases. Digital photography also allows modifications of captured digital images heretofore unavailable in conventional film photography.

Some types of digital cameras include built in orientation sensors. An orientation sensor is used to determine if the user has the camera in regular landscape mode or if the camera has been rotated to take a picture in the portrait mode. The inclusion of the orientation sensor allows the images to be displayed on a liquid crystal display in the correct orientation. One type of orientation sensor includes a metallic ball resident within a small enclosure. When the camera is positioned in a landscape orientation, the ball rests on the bottom of the small enclosure and allows a contact to be made between two pins positioned at the bottom of the chamber. This electrical contact between the two pins enables the software resident within the camera to determine that the camera is positioned in landscape mode. Similarly, if the camera is positioned in a portrait mode, the metallic ball causes an electrical connection to occur between two separate pins allowing the software to correctly determine that the camera is in the portrait mode. This type of orientation sensor allows a differentiation between landscape mode and portrait mode.

Conventional film cameras also have incorporated leveling devices to provide an indication when the film plane is perpendicular to the ground and level. A bubble type "spirit" level may be attached to an architectural view camera to provide for leveling of the camera body so as to insure that it is parallel to a structure to be photographed and level with respect to the horizontal.

All of these prior art devices required manual orientation and positioning of a camera to achieve a desired effect.

SUMMARY OF THE INVENTION

The present invention is directed to a system and method for correcting inadvertent errors in an orientation of vertical or horizontal lines within a captured image in a digital camera. The method of the present invention in one embodiment includes the steps of receiving a digital representation of an image, identifying vertical or horizontal objects within the image, determining the orientation errors or tilt associated with at least one of the vertical or horizontal objects, electronically rotating the digital representation of the image in a manner to eliminate the determined orientation error and displaying a corrected digital image.

One embodiment of the system of the present invention includes a user selectable input, a processor which checks the user selectable input, a tilt determining mechanism which determines the orientation error when enabled by the processor to do so, a view finder or image preview display which is used to display the digital image as modified by the processor, and a memory to store the digital representation of the image within.

DETAILED DESCRIPTION

Generally, the present invention relates to a method and a system which is used to correct the introduction of inadvertent errors of horizontal or vertical components contained within an image. More particularly, the present invention relates to a digital camera system which automatically compensates for the introduction by the user of errors in the horizon, or in vertical members. The automatic correction of inadvertent errors may occur, preferably in the digital camera, or alternatively, in the digital image itself on a computer.

Figure 1:
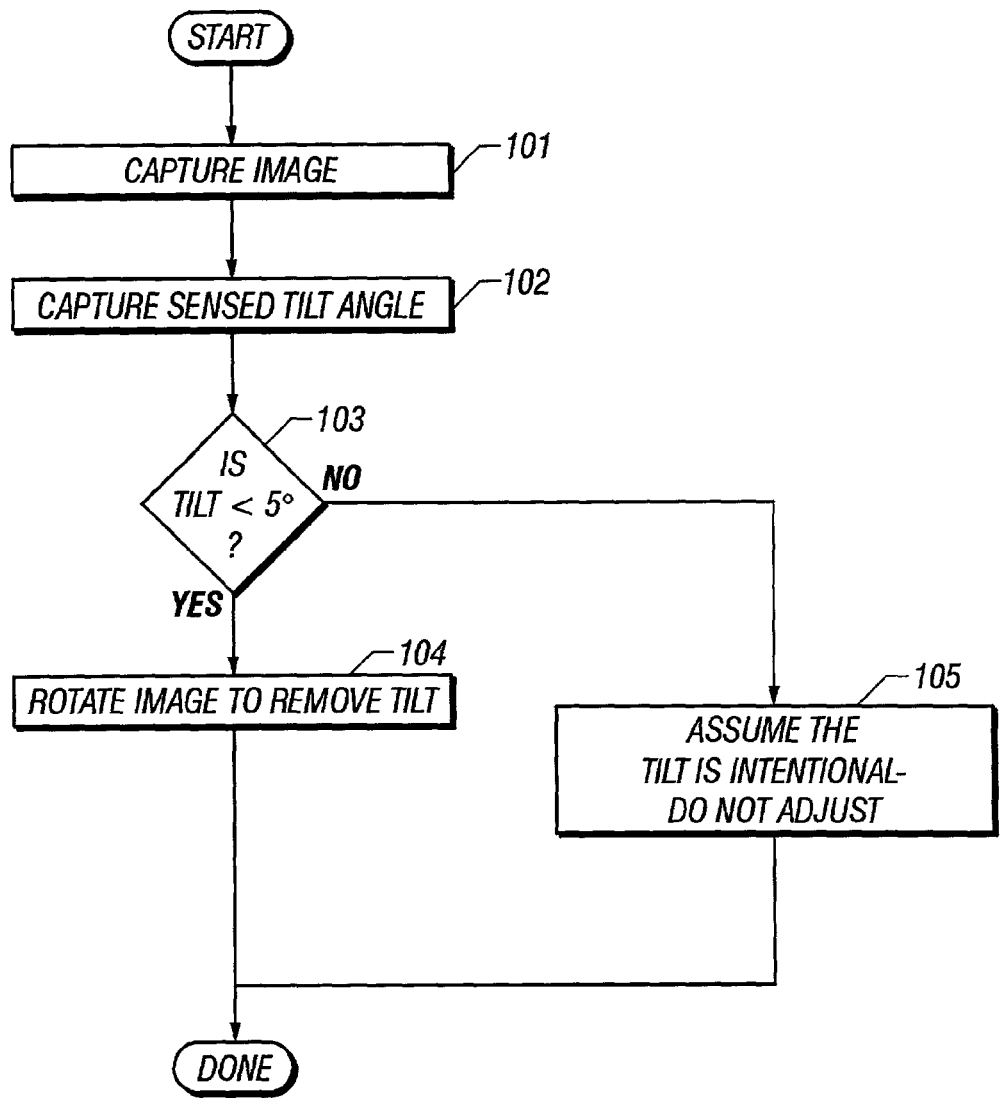
FIG. 1 is a flow diagram of a tilt correction procedure implemented by a system of the present invention which includes a hardware tilt sensor.

FIG. 1 is a flow diagram which depicts a procedure used to implement a tilt correction feature which includes a hardware tilt sensor. In step 101, the digital image is captured. Since FIG. 1 includes a hardware tilt sensor, in step 102 the hardware tilt sensor is interrogated to determine the actual tilt angle sensed. In step 103 a comparison is made between the sensed tilt angle and a maximum value of the tilt angle for correction. FIG. 1 shows a maximum correction of five degrees. If the sensed tilt angle is less than five degrees, step 104 is executed and the digital image captured is rotated to remove the tilt angle. Rotation of the image may be performed using conventionally available image processing routines and would normally be performed prior to image compression and storage into memory. The rotated image is then displayed to the user. Alternatively, in step 103 if the sensed tilt angle is determined to be greater than the maximum tilt angle of five degrees, the image is not rotated to remove the tilt or orientation error. This is because an assumption is made, that an orientation error or tilt angle of five degrees or greater must have been intentionally introduced by the user of the system or is present in the captured image and the digital image displayed in the viewfinder is not corrected. Of course, the five degree figure can be adjustable or removable, if desired.

Figure 2:
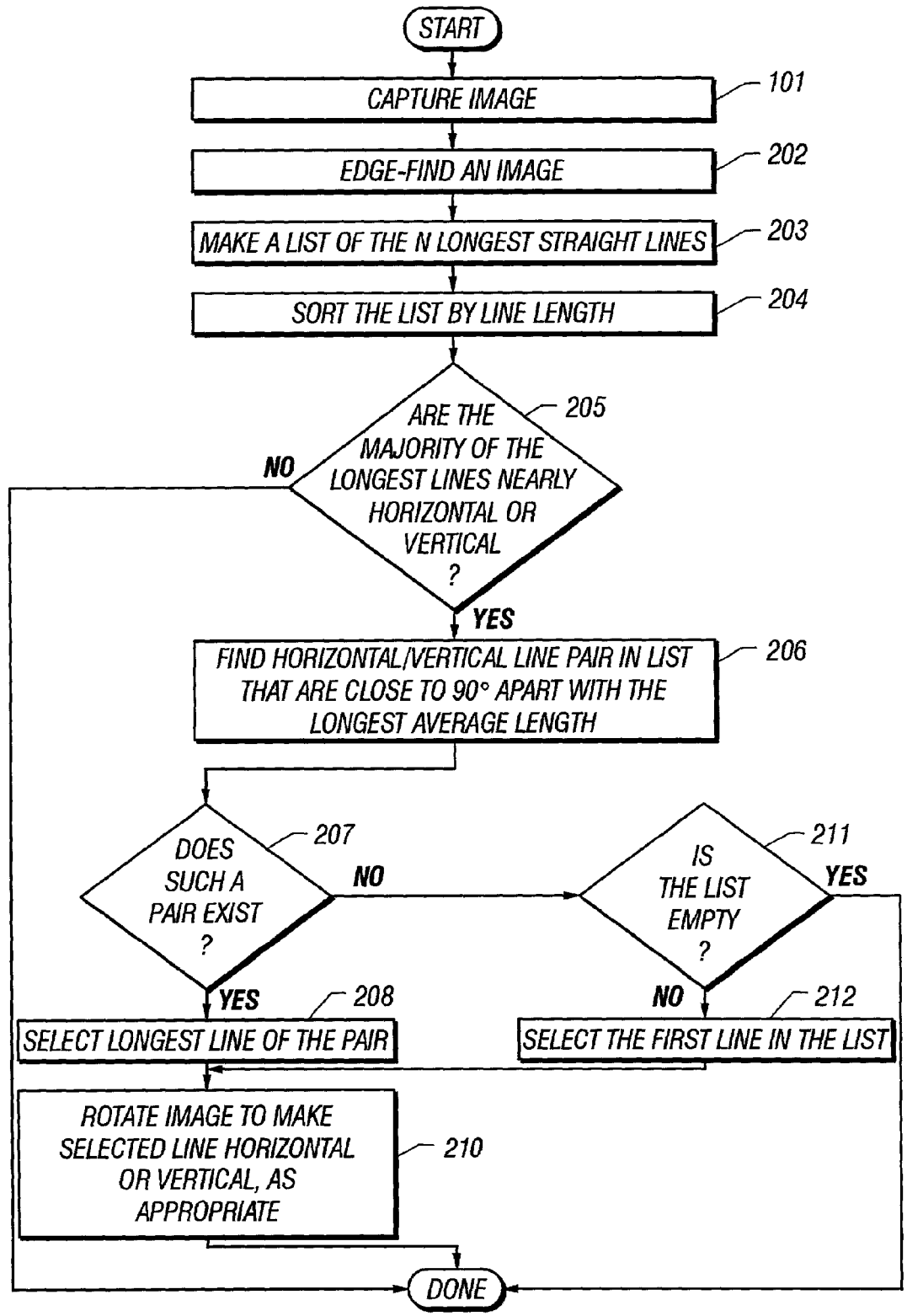
FIG. 2 is a flow diagram of a tilt correction procedure implemented by a system which includes software based orientation error detection and correction.

FIG. 2 is a flow diagram of a procedure incorporated into a system in accordance with the present invention which includes an orientation error detection method implemented through software. The flow diagram of FIG. 2 begins with a capture of the digital image in step 101. Once the digital image is captured in step 101, a software program is initiated which attempts to determine edges of objects contained within the image in step 202. Once object edges are identified within the image, step 203 generates a list of a number of the longer straight lines included within the digital image. In step 204, the list of longer straight lines is sorted to determine the captured straight lines with the greatest length. In step 205, a determination is made by the software concerning whether a majority of captured straight lines are aligned within five degrees horizontally or vertically. A mixture of horizontal and vertical lines can also be successfully analyzed by the software. If a majority of the lines cannot be identified which are oriented either horizontally/vertically the orientation error or tilt of the digital image cannot be ascertained. However, returning to step 205, if the majority of the longer lines are horizontal or vertical, step 206 determines whether horizontal or vertical line pairs are present which are perpendicular with respect to each other. If such a pair exists, as determined in step 207, the longest line pair of horizontal and vertical lines are selected in step 208. Once the longest line of the pair has been determined, the orientation error of the horizontal and vertical pairs are determined and in step 210 the image is rotated to eliminate the orientation error determined. Returning to step 207, if a horizontal and vertical line pair have not been determined which are perpendicular with respect to each other, the longest line identified is used to determine the orientation error. This determination is performed in steps 211 and 212.

Figure 3:
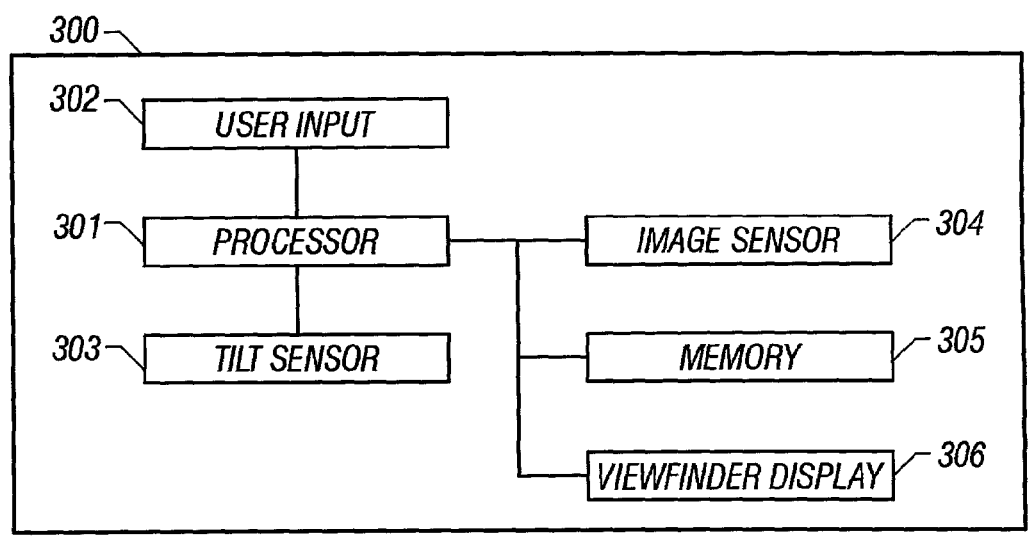
FIG. 3 is a hardware block diagram of a camera which incorporates the present invention.

FIG. 3 includes a block diagram which depicts camera 300 which includes a system in accordance with the present invention. The camera includes processor 301 which interfaces with user input 302, tilt sensor 303, image sensor 304, memory 305 and viewfinder display 306. Processor 301, which can, by way of example, be Philips DSC SAA8122A, ZORAN Corp. COACH LC, etc., accepts user input 302 from the user which may consist of a decision as to whether orientation error detection and correction should be performed or whether the user wishes to disable this feature. Processor 301 may also receive information from tilt sensor 303, if present. The tilt sensor function may also be implemented through a software routine. Processor 301 may also receive an input from image sensor 304 which captures the image. Processor 301 also stores a captured digital image in memory 305 and displays the corrected and/or uncorrected digital image on viewfinder display 306. Memory 305 can be either permanently marked within the camera, removable or partially both. Example components suitable for memory 305 include SDRAM (MICRON Technologies Inc. MT48LC64M4A2), non-removable flash memory (Intel 28F320S3), removable flash-card (Hitachi HB288032MM1), compact flash memory cards, memory stick, and SmartMedia.

What is claimed is:

1. A method for automatic detection and correction of image orientation errors comprising the steps of:
   receiving a digital representation of an image;
   identifying at least one vertical or horizontal object within said image;
   determining an orientation error of at least one of said identified vertical or horizontal objects;
   rotating said digital representation of said image in a manner to reduce said orientation error; and
   displaying a corrected digital image, wherein said steps of receiving, identifying, determining, rotating, and displaying are performed within a digital camera.

2. The method of claim 1 wherein both horizontal and vertical objects are used in said automatic detection of orientation errors.

3. The method of claim 1 further comprising the step of:
   checking a disable feature to ensure said automatic detection and correction of orientation errors should be performed.

4. The method of claim 1 further comprising the step of:
   disabling said automatic correction of orientation errors for orientation errors in excess of a predetermined maximum amount.

5. The method of claim 1 further comprising the steps of:
   compressing said corrected digital image to provide compressed image data; and
   storing said compressed image data in a memory.

6. The method of claim 1 wherein said automatic detection of orientation errors is performed from identified edges of objects contained within the digital representation of an image.

7. The method of claim 1 wherein said automatic detection of orientation errors includes operating a tilt angle sensor to determine a tilt parameter value.

8. An image orientation correction system comprising:
   a user-selectable input device;
   a tilt determining mechanism configured to automatically sense orientation errors of received images;
   a processor configured to respond to said user-selectable input device and to send said orientation errors of an image for modifying said image to remove said orientation errors; and;
   a display configured to display a digital image as modified by said processor.

9. The orientation correction system of claim 8 wherein:
   said user-selectable input allows a user to disable said orientation correction system.

10. The orientation correction system of claim 8 wherein:
    said tilt determining mechanism includes a tilt sensor.

11. The orientation correction system of claim 8 wherein:
    said tilt determining mechanism is implemented via software.

12. The orientation correction system of claim 11 wherein said software implemented tilt determining mechanism detects and uses an edge of an object contained within said digital representation of said image to determine said orientation errors of said digital image.

13. The orientation correction system of claim 8 further including:
    n automatic disable feature which disables said orientation correction when said orientation error is determined to be greater than a predetermined maximum error value.

14. The orientation system of claim 13 wherein said predetermined maximum error value is five degrees.

15. A camera comprising:
- an image sensor;
- a display connected to display an image captured by said image sensor;
- an orientation sensor automatically identifying an orientation of said image sensor with respect to said image captured by said image sensor; and
- an image processor responsive to said orientation sensor for performing a rotation operation on said image captured by said image sensor so as to provide corrected image data reducing a misalignment of said image.

16. The camera according to claim 15 further comprising:
- a memory configured to store said corrected image data.

17. The camera according to claim 16 wherein said image captured by said image sensor is stored in said memory when said identified orientation is greater than a predetermined maximum value.

18. The camera according to claim 15 further comprising:
- an image compressor configured to perform compression of said corrected image data.

19. The camera according to claim 18 wherein said image compressor implements a lossy image compression algorithm.

* * * * *

UNITED STATES PATENT AND TRADEMARK OFFICE
CERTIFICATE OF CORRECTION

PATENT NO. : 7,079,707 B2  Page 1 of 1
APPLICATION NO. : 09/909534
DATED : July 18, 2006
INVENTOR(S) : John M. Baron It is certified that error appears in the above-identified patent and that said Letters Patent is hereby corrected as shown below:

In column 4, line 45, in Claim 8, delete "and;" and insert -- and --, therefor.

In column 4, line 64, in Claim 13, delete "n" before "automatic" and insert -- an --, therefor.

Signed and Sealed this

Twelfth Day of May, 2009

JOHN DOLL
*Acting Director of the United States Patent and Trademark Office*